(12) United States Patent
Freundt et al.

(10) Patent No.: US 10,792,761 B2
(45) Date of Patent: Oct. 6, 2020

(54) PRESSING SYSTEM, LASER-JOINING SYSTEM, AND METHOD

(71) Applicant: Manz AG, Reutlingen (DE)

(72) Inventors: Martin Freundt, Esslingen (DE); Ralf Neher, Balingen (DE); Benjamin Schmieder, Stuttgart (DE)

(73) Assignee: Manz AG, Reutlingen (DE)

( * ) Notice: Subject to any disclaimer, the term of this patent is extended or adjusted under 35 U.S.C. 154(b) by 311 days.

(21) Appl. No.: 15/820,709

(22) Filed: Nov. 22, 2017

(65) Prior Publication Data

US 2018/0147664 A1    May 31, 2018

(30) Foreign Application Priority Data

Nov. 25, 2016 (EP) .................................... 16200637

(51) Int. Cl.
*B23K 26/08* (2014.01)
*B23K 26/035* (2014.01)
(Continued)

(52) U.S. Cl.
CPC .......... *B23K 26/0861* (2013.01); *B23K 26/02* (2013.01); *B23K 26/037* (2015.10);
(Continued)

(58) Field of Classification Search
CPC .. B23K 26/0861; B23K 26/037; B23K 26/02; B23K 26/20; B23K 26/206; B23K 26/22;
(Continued)

(56) References Cited

U.S. PATENT DOCUMENTS 5,194,710 A    3/1993  McDaniel et al.
5,324,913 A *  6/1994  Oberg .................. B23K 26/037
                                              219/121.63
(Continued)

FOREIGN PATENT DOCUMENTS

CN    101472703 A    7/2009
CN    202804063 U    3/2013
(Continued)

OTHER PUBLICATIONS

Chinese Office Action with Search Report dated Mar. 25, 2019 in Chinese Application No. 201711192164.9 with English translation.
European Office Action in EP 16200637.3 dated Mar. 13, 2017 with English translation of relevant parts.

*Primary Examiner* — Nicholas J. Weiss
(74) *Attorney, Agent, or Firm* — Collard & Roe, P.C.

(57) ABSTRACT

A pressing system for a laser joining system for pressing together parts to be joined (storage cell, base plate) in the area of a joining point, includes a receptacle for accommodating the parts to be joined, a pressing element for locally pressing together the parts to be joined, in the area of the joining point, and a positioning system for the relative positioning of the pressing element and the receptacle and for pressing together the parts to be joined, during the joining process. The positioning system includes a parallel positioning device for the relative positioning of the receptacle and the pressing element in parallel to a plane (E), and an oblique positioning device for the relative positioning of the pressing element and the receptacle obliquely, in particular transversely, with respect to the plane (E) and for pressing together the parts to be joined, during the joining process.

8 Claims, 2 Drawing Sheets

(51) Int. Cl.
*B23K 26/20* (2014.01)
*B23K 37/02* (2006.01)
*B23K 37/04* (2006.01)
*B23K 26/02* (2014.01)
*B23K 26/22* (2006.01)
*B23K 101/36* (2006.01)

(52) U.S. Cl.
CPC ............ *B23K 26/20* (2013.01); *B23K 26/206* (2013.01); *B23K 26/22* (2013.01); *B23K 37/0229* (2013.01); *B23K 37/0408* (2013.01); *B23K 2101/36* (2018.08)

(58) Field of Classification Search
CPC ............ B23K 37/0229; B23K 37/0408; B23K 2101/36
See application file for complete search history.

(56) References Cited

U.S. PATENT DOCUMENTS

| | | | |
|---|---|---|---|
| 8,299,392 B2 | 10/2012 | Johnson | |
| 9,044,828 B2 * | 6/2015 | Lee | B23K 37/04 |
| 2005/0230363 A1 | 10/2005 | Debuan et al. | |
| 2007/0221637 A1 | 9/2007 | Schurmann et al. | |
| 2010/0219165 A1 | 9/2010 | Woltering et al. | |
| 2014/0360991 A1 | 12/2014 | Steiner et al. | |
| 2016/0368084 A1 | 12/2016 | Henneke et al. | |

FOREIGN PATENT DOCUMENTS

| | | |
|---|---|---|
| CN | 203184866 U | 9/2013 |
| CN | 204248220 U | 4/2015 |
| CN | 204686279 U | 10/2015 |
| CN | 105324208 A | 2/2016 |
| DE | 20 2009 008 851 U1 | 11/2010 |
| WO | 2011/133278 A2 | 10/2011 |

* cited by examiner

PRESSING SYSTEM, LASER-JOINING SYSTEM, AND METHOD

CROSS REFERENCE TO RELATED APPLICATIONS

Applicant claims priority under 35 U.S.C. § 119 of European Application No. 16200637.3 filed on Nov. 25, 2016, the disclosure of which is incorporated by reference.

BACKGROUND OF THE INVENTION

The invention relates to a pressing system for a laser-joining system for pressing together parts to be joined, in the area of a joining point.

Devices for pressing on the parts to be joined are usually utilized for connecting parts to be joined by means of laser joining.

This also relates, in particular, to the production of current accumulators.

Modern current accumulators consist of a plurality of storage cells which are disposed on a shared base plate and are joined together therewith at joining points, in particular by means of laser joining. A base plate in this sense can be, for example, circuit boards or connection plates for forming one of the poles (positive or negative poles) or a measuring point of the current accumulator, and so a current accumulator can also comprise several such base plates.

For the purpose of laser joining, the storage cells and the base plate must be initially disposed at a joining point of the base plate. Subsequent thereto, the two parts to be joined are pressed together and are laser-joined, for example laser-welded, to each other at the joining point.

The pressing system provided for applying pressure is usually formed as a plate or a mask comprising spring elements for each of the joining points. For this purpose, the mask is generally matched individually to the particular parts to be joined to one another and are individually produced.

The mask is pressed onto the base plate, whereby the particular storage cells are pressed onto the base plate simultaneously at all or at least at a plurality of joining points. As soon as all parts to be joined have been pressed onto the particular counterpart or onto the base plate, the parts to be joined are successively joined to each other at the particular joining points.

The disadvantage thereof, on the one hand, is that such a pressing system requires a mask which is individually matched to the particular joining task. Moreover, it is problematic that, in the case of a large number of joining points, for example several hundred or thousand joining points, as is the case, for example, with high-performance current accumulators, the necessary contact pressure with which the mask must be pressed against the parts to be joined increases linearly with the number of joining points. In addition, the quality of the pressure applications at the joining points can be assured only in entirety. Faulty pressure exertions, for example gap separations due to height differences within the scope of production tolerances of storage cells, can be monitored or eliminated only on a highly limited basis.

SUMMARY OF THE INVENTION

The problem addressed by the present invention is therefore that of providing a pressing system for a laser-joining system as well as a laser-joining system and a method, with the aid of which the joining of parts to be joined by means of a laser-joining system is improved.

The invention is solved by a pressing system for a laser-joining system for pressing together parts to be joined, in the area of a joining point, comprising
  a receptacle for accommodating the parts to be joined,
  a pressing element for locally pressing together the parts to be joined, in the area of the joining point,
  a positioning system for the relative positioning of the pressing element and the receptacle and for pressing together the parts to be joined, during the joining process, in particular comprising
    a parallel positioning device for the relative positioning of the receptacle and the pressing element in parallel to a plane, and
    an oblique positioning device for the relative positioning of the pressing element and the receptacle obliquely, in particular transversely, with respect to the plane and for pressing together the parts to be joined, during the joining process.

Such a pressing system makes it possible to press together parts to be joined, only locally in the area of the joining point. In this case, the invention makes use of the discovery that the joining process is generally a determinant of the speed of the entire process and, therefore, the parts to be joined are to be pressed together initially only at the particular joining point. During the joining at a joining point, there is a waiting period, therefore, which has been unused up to now, during which a processing at another joining point can be prepared.

A pressing element can also be much smaller and can have less mass in this case, since pressure is not exerted over a large area with the aid of a plate or mask, as in the prior art, but rather only spot-wise. Therefore, only a low total contact pressure is required, independently of the number of joining points or the number of points to be joined together. As a result, a simpler mechanical system can be utilized, whereby cost and performance advantages can be achieved with the laser-joining system according to the invention.

The receptacle can be stationary or movable relative to a machine housing or relative to the location of the laser-joining system. The receptacle can be formed, in particular, as a support, a table, or as a conveyor-belt section. The receptacle can also be formed as a holder for accommodating a type of part to be joined. For example, the receptacle can be a carrier, on which storage cells are arranged in matrix form. A base plate can be placed on the storage cells, and so the storage cells, including the base plate, can be joined to each other at joining points distributed in a matrix form. It is understood in this case that the arrangement of parts to be joined, in the receptacle can also take place according to other criteria, for example in such a way that a maximum number of parts to be joined, or storage cells, can be arranged, in particular next to each other.

The plane can extend, for example, in parallel to one side of a part to be joined, in particular in parallel to a base plate.

In particular, for the purpose of joining at a joining point, the pressing element can be moved by means of the parallel positioning device toward the joining point, relative to the receptacle, in parallel to a plane formed by the base plate. By means of the oblique positioning device, the pressing element can then be displaced relative to the receptacle, for example transversely, in particular perpendicularly, with respect to the plane. The pressing element can therefore press against the base plate at the joining point and can therefore press a storage cell lying under the base plate against the base plate until the two parts to be joined come into gapless contact. Subsequent thereto, the two parts to be joined can be joined to each other by means of a joining laser. The oblique positioning device is configured in this case for pressing the parts to be joined together, against each other during the joining process.

In one particularly advantageous embodiment of the invention, a pressing system comprising at least two pressing elements including at least two positioning systems, in particular at least two parallel positioning devices and at least two oblique positioning devices, can be provided. The two pressing elements can then be displaced independently of each other.

In particular, a first pressing element at a first joining point can press together two parts to be joined, while a second pressing element is displaced to a second joining point. Therefore, a subsequent joining point can be moved to already during the joining process at the first joining point. It is advantageously effective, in particular in this case, that the focus of the joining laser can generally be displaced substantially more rapidly than a (mechanical) pressing element, for example by means of a scanner unit. The joining process itself requires a comparatively long period of time, however. A pressing element can therefore be displaced relative to the receptacle, in parallel to the plane, at a comparatively low speed by means of the parallel positioning device. Idle times or interruptions in the joining process due to switching the joining points can be avoided or reduced to a minimum.

In this case, it can be provided that at least one parallel positioning device comprises a scissors mechanism and/or a linear drive. In particular, the scissors mechanism can be formed by means of a scissors linkage and a linear drive. Due to the scissors mechanism, the required installation space can be reduced and good accessibility can be achieved, in particular the ability to comparatively freely position a joining laser of the laser-joining system. The scissors mechanism can also be controlled from one side of the laser-joining system.

The oblique positioning device can comprise a linear drive and/or a pneumatic drive. It can also include an electrical and/or magnetic drive. In this case, the relative positioning of the pressing element and the receptacle can take place in a particularly low-mass and, therefore, low-inertia manner, in particular by means of a pneumatic drive, for example a pneumatic cylinder.

At least one pressing element can comprise a sensor, in particular a position sensor for localizing a joining point, a temperature sensor, and/or a force sensor for measuring the contact pressure. For example, the contact pressure can be determined by means of the pressing element.

If storage cells have different dimensions due, for example, to production tolerances, the pressing element can be relatively displaced toward the receptacle until a minimum contact pressure is registered by a force sensor. It can therefore be ensured in a particularly easy way that the two parts to be joined are pressed together in a largely or completely gap-free manner.

The sensor can be formed as a separate sensor. It is also conceivable to form the sensor in the form of a sensor system which is integrated, in particular. For example, the sensor can be formed by a device which is configured for evaluating, for example, a piece of position information, a motor current, a control deviation from a previously recorded measured value, or the like, preferably of a positioning system, in particular a parallel and/or oblique positioning device.

It is particularly advantageous to evaluate a force-displacement curve. It is therefore possible to ascertain, for example on the basis of the occurrence of a jump in the measured force, whether one of the parts to be joined or one of the surfaces is deformed and/or whether the part to be joined contacts the other part to be joined.

At least one pressing element can comprise a temperature-control element, preferably for controlling the temperature of at least one area of the joining point. An area around the joining point on the base plate can then be cooled during the joining process.

A particularly advantageous pressing system results when at least one pressing element comprises a gripper, preferably for gripping a component, for example an individual element. This makes it possible, for example, to arrange storage cells in succession on the base plate, while other storage cells are joined with the base plate at the particular joining point.

It can also be provided that at least one pressing element has a passage region for the passage of a joining laser beam. For example, the pressing element can be annular or cylindrical for this purpose. This makes it possible, for example, to allow the joining laser beam to pass through the pressing element and therefore join the parts to be joined to each other through the pressing element.

The invention also relates to a laser-joining system for joining parts to be joined, in the area of a joining point, comprising:
a joining laser generating a joining laser beam, and
a pressing system according to the invention.

Such a laser joining system can be utilized in a flexible manner for highly diverse types of parts to be joined. The laser joining system according to the invention is particularly suitable for joining storage cells to a base plate of a current accumulator. The laser joining system according to the invention makes it possible to produce such a current accumulator particularly cost-effectively from its individual components. The laser joining system is also capable of producing different types of current accumulators using only minimal set-up effort.

One further improvement of the laser joining system results when a beam positioning system of the joining laser is displaceable, in particular in parallel to the plane, and/or comprises a scanner for controlling the joining laser beam, in particular in parallel to the plane.

If the beam area of the joining laser is smaller than the work area of the laser joining system, the joining laser can be displaced within the work area and the beam area can be displaced within the work area by means of a displaceable beam positioning system. A scanner for controlling the joining laser beam also allows for a very rapid deflection of the joining laser beam. A scanner also provides for a wide beam area.

The laser joining system can comprise a focal position adjusting device for adjusting the focal position of the joining laser beam. The focal position can be adjusted with the aid of a focal position adjusting device. Therefore, one additional adjustment possibility results, by way of which the joining process can be optimized.

Moreover, the scope of the invention also comprises a method for joining parts to be joined, in particular a base plate and a storage cell, in the area of a joining point, by means of a laser joining system according to the invention, including the steps:
a) accommodating the parts to be joined, in or on a receptacle of a pressing system of the laser joining system;

b) carrying out the relative positioning of a pressing element of the pressing system and the receptacle with respect to the joining point, in particular by means of a parallel positioning device of the pressing system;
c) locally pressing together the parts to be joined, in the area of the joining point, by means of the pressing element;
d) joining the parts to be joined, at the joining point, by means of a joining laser of a laser joining system.

The pressing element and the receptacle are therefore positioned relative to each other in such a way that the pressing element is located in an area of the parts to be joined, which is disposed in the receptacle and in which these parts are to be joined.

This method makes it possible to locally press together parts to be joined, in the area of the joining point, and to join these parts to each other at the joining point. Since the parts to be joined are pressed together only locally, a particularly simple and cost-effective joining process results.

In this case, "pressed together locally" is understood to mean that the parts to be joined are pressed together only in the area of the joining point, in particular by means of a positioning system, preferably an oblique positioning device and a pressing element.

If, in particular, multiple similar parts to be joined, for example storage cells, are pressed onto another part to be joined, for example a base plate, then "pressed together locally" is understood to mean, in particular, that not all parts to be joined are simultaneously pressed onto the other part to be joined. With respect to the production of a current accumulator, this means that not all or a preponderant number of storage cells are simultaneously pressed onto the base plate.

A particularly advantageous method results when a second pressing element and the receptacle are positioned relative to a second joining point, which is to be subsequently processed, while
    a first pressing element and the receptacle are positioned relative to a first joining point, and/or
    parts to be joined are pressed together locally at the first joining point, and/or
    parts to be joined are joined at the first joining point.

In other words, the processing of the second joining point can be prepared already while the processing by the first pressing element takes place or is prepared for at the first joining point. In particular, it is provided to bring the second pressing element into the area of the second joining point, so that parts to be joined can be subsequently pressed together and joined there. Considerable time savings can therefore be achieved.

In this case, it can be provided, in particular, that a beam area of a joining laser beam of the joining laser is displaced relative to the first joining point in a stepwise manner in parallel to the plane of the pressing system. The beam area of the joining laser beam is often smaller than the work area of the laser joining system overall. The focus of the joining laser beam can be displaced within the beam area at a very high speed in parallel to the plane. For example, this displacement can be achieved by means of a scanner which generally operates very rapidly.

For example, a joining can take place at the first joining point. If the second joining point is now also located within the beam area, after conclusion of the joining process at the first joining point, the laser beam can be displaced at a very high speed to the second joining point in order to join the parts to be joined, that are located there. Joining points located, for example, within a beam area, can therefore be processed in succession very rapidly, without the need to displace the beam area. All that is necessary is for a pressing element to be "moved along" the individual joining points or for multiple pressing elements to be alternately "moved along" by means of the corresponding parallel positioning devices.

If a beam area has been processed, the beam area can be displaced in a stepwise manner, in order to be able to also process joining points located in the new beam area at a high speed.

It can also be provided that the beam area is displaced relative to the first joining point at least intermittently continuously in parallel to the plane. For example, it can be provided to displace the receptacle relative to the laser joining system. If the receptacle is formed as a conveyor belt, for example, the conveyor belt can be continuously (slowly) moved. This relative motion can be compensated for, for example, within the beam area by correspondingly counter-controlling the joining laser beam by means of the scanner and/or the pressing element. It is therefore possible to also process, for example, particularly large parts to be joined, for example particularly large base plates of a current accumulator.

At least one process parameter, in particular the contact pressure and/or the position along the pressing direction and/or the geometry of at least one part to be joined, can be detected by means of a sensor disposed on a pressing element and/or by means of the pressing element itself. In particular, the joining process can be monitored and/or released or blocked by means of the process parameter.

For example, the pressing element can be utilized as a tactile sensor. It is therefore possible, for example, to detect a position of a base plate and/or its outer geometry in the area of the joining point. A fringe pattern processing unit, for example, can therefore be dispensed with. If the pressing element comprises a force sensor, it is possible to monitor, for example, on the basis of the reaction of the contact pressure, whether the two parts to be joined have been gaplessly pressed together or whether the contact pressure must be further increased before the joining process can be released or started.

The focal position of the joining laser beam can also be controlled depending on the process parameter. For example, the surface position of the joining point can be ascertained as the process parameter on the basis of the position of the pressure point of the pressing element. The focal position can then be matched to this position, for example, for penetration by the joining laser.

It is particularly advantageous when the focal position is displaced obliquely, in particular transversely, with respect to the plane, while the joining laser beam is displaced relative to the first joining point in parallel to the plane. This is based on the idea that the focal position often also can be displaced only at a comparatively low speed. In particular, the penetration depth of the joining laser beam into one of the parts to be joined, i.e., the "vertical position", can often be changed only slowly. It has been shown, however, that laser joining can also usually be carried out with high quality despite a rough setting of the focal position.

Therefore, the joining laser beam can "penetrate" at the first joining point, join together the parts to be joined that are located there, and then, during the "emergence" from one of the parts to be joined, can be further deflected to the next joining point, in order to again correspondingly "penetrate" a part to be joined, at this point, without delay.

Further features and advantages of the invention result from the following detailed description of variants of the method according to the invention and of exemplary embodiments of a laser joining system which is suitable for carrying out the method, with reference to the figures in the drawing, which show the details that are essential to the invention. Further features and advantages of the invention also result from the claims. The individual features can be implemented individually, or they can be combined in any possible manner to form variants of the invention.

BRIEF DESCRIPTION OF THE DRAWINGS

Exemplary embodiments and variants of the invention are represented in the schematic drawing and are described in greater detail in the description that follows.

In the drawings.

DETAILED DESCRIPTION OF THE EMBODIMENTS

The design and the mode of operation of a laser joining system and of the method according to the invention are to be described in greater detail, by way of example, on the basis of the production of a current accumulator.

Figure 1:
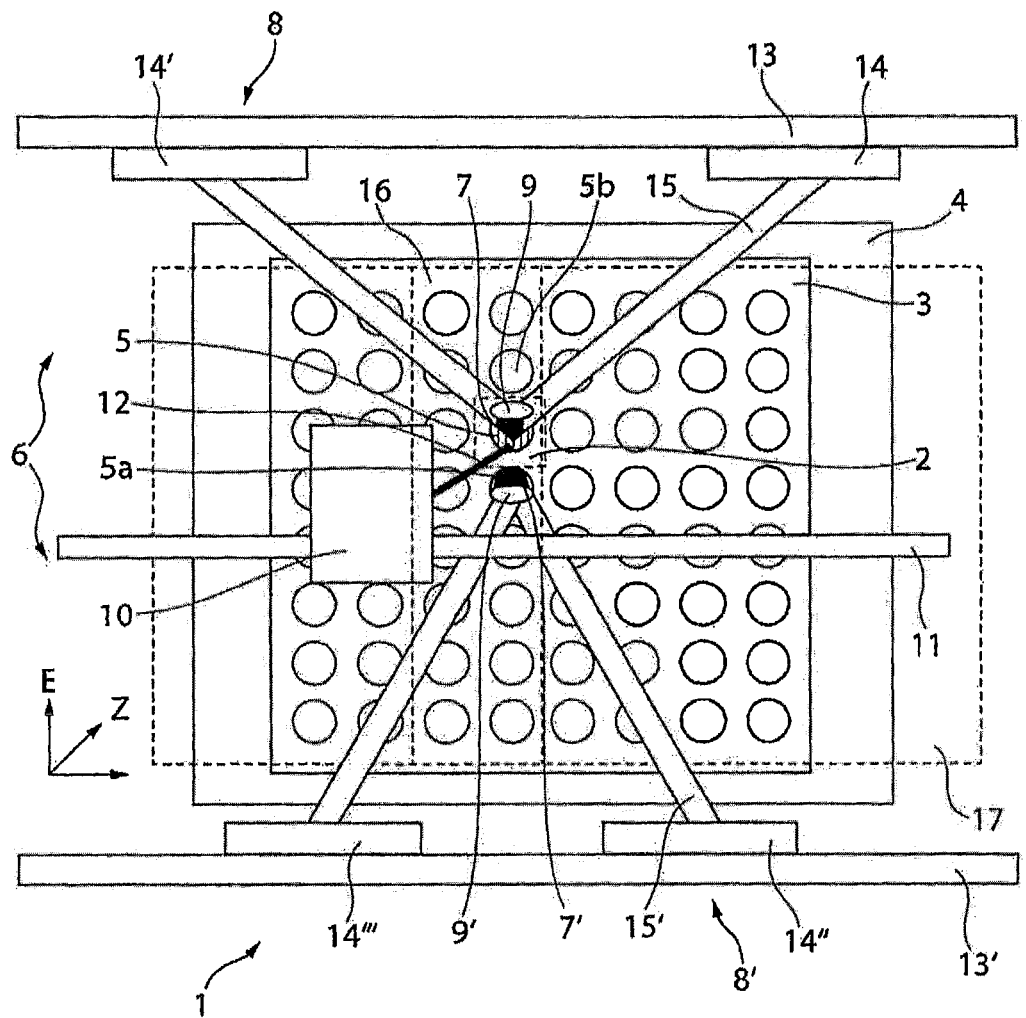
FIG. 1 shows a schematic representation of a top view of the laser joining system.

For this purpose, FIG. 1 shows a laser joining system 1 comprising a storage cell 2 which is to be laser-joined, in particular laser-welded, onto a base plate 3.

The laser joining system 1 comprises a receptacle 4. In the receptacle 4, the base plate 3 and, therebelow, (not visible in the top view from FIG. 1 and therefore represented merely using dashed lines), the storage cell 2 are disposed at a first joining point 5. It is understood that a plurality of storage cells are disposed under the base plate 3 at a plurality of joining points, in order to attain a high storage capacity of the current accumulator, and the storage cells are to be joined with the base plate 3. In particular, a second joining point 5a and a third joining point 5b are represented, by way of example.

The laser joining system 1 comprises a pressing system 6. The pressing system 6 comprises two pressing elements 7, 7'. Each of the pressing elements 7, 7' is guided by a parallel positioning device 8, 8' and an oblique positioning device 9, 9'.

In addition, it is apparent that a joining laser 10 is displaceable within the laser joining system 1 along a laser slide rail 11.

In one alternative embodiment, the joining laser 10 is displaceable both in a longitudinal direction as well as a transverse direction by means of an at least two-dimensional positioning device, in order to therefore allow for an even larger displacement area.

The joining laser 10 generates a joining laser beam 12 which, in the state depicted in FIG. 1, is directed toward the first joining point 5.

The parallel positioning devices 8, 8' are used for the relative positioning of the receptacle 4 and the pressing elements 7 and 7', respectively, in parallel to the plane E extending along the base plate 3.

A z-direction is marked in FIG. 1 perpendicular to the plane E spanned by the base plate 3.

The oblique positioning devices 9 and 9' are configured for carrying out the relative positioning of the pressing elements 7 and 7', respectively, and the receptacle 4 obliquely, in particular transversely, with respect to the plane E, i.e., along the z-direction. Moreover, the oblique positioning devices 9, 9' are used for pressing together the parts to be joined, in particular the base plate 3 and the storage cell 2, during the joining process.

Each of the parallel positioning devices 8, 8' comprises slide rails 13, 13', respectively. Linear drives 14, 14', 14'', 14''' are displaceably disposed on the slide rails 13, 13'. The slide rails 13, 13', together with the linear drives 14, 14', 14'', 14''', form linear motors, by way of which the scissors mechanisms 15, 15' are controlled.

The slide rails 13, 13' are disposed on both sides of the receptacle 4. It is therefore possible to displace the pressing elements 7, 7' so far to the side that the area of the receptacle is freely accessible from above, and so the parts to be joined can be positioned on the receptacle 4 or can be removed, e.g., by means of a gripper.

The oblique positioning devices 9, 9' are disposed at the articulation points of the scissors mechanisms 15, 15'. The oblique positioning devices 9, 9' are both formed as pneumatic cylinders. By means of the pneumatic cylinders, the pressing elements 7, 7' can be displaced along the z-direction. In particular, the pressing elements 7, 7' can therefore be pressed against the base plate 3.

In the state of the laser joining system 1 depicted in FIG. 1, the base plate 3 and the storage cell 2 can be pressed together locally at the first joining point 5 by means of the pressing element 7, by way of the pneumatic cylinder being actuated.

The position of the pressing element 7 or 7' can be determined by means of a position sensor of the oblique positioning element 9 or 9', respectively.

Moreover, the joining laser 10 comprises a scanner for controlling the joining laser beam 12. The scanner is used in this case for rapidly deflecting the joining laser beam 12 within the beam area 16. If the joining laser 10 is therefore displaced along its laser slide rail 11, the beam area 16 is also displaced. The beam area 16 can therefore pass over the work area 17 of the laser joining system 1.

Moreover, the joining laser 10 comprises a focal position adjusting device. The focal position adjusting device is used for adjusting the focal position of the joining laser beam 12.

Moreover, the pressing elements 7, 7' also comprise temperature-control elements. The temperature-control elements are formed, in particular, as cooling elements. They are used for cooling the area surrounding a joining point 5, 5a, 5b by means of the pressing elements 7, 7' during the laser joining.

The contact area or pressure point of the pressing elements 7, 7' is annular, and so a passage region results, through which the joining laser beam 12 can pass.

Figure 2:
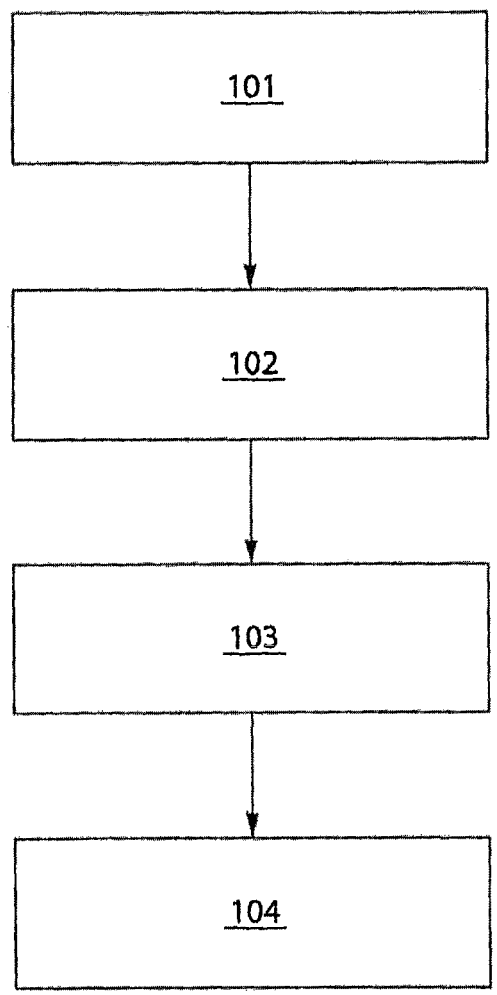
FIG. 2 shows the method according to the invention.

FIG. 2 schematically shows the method according to the invention for joining parts to be joined.

The method is described in greater detail in the following on the basis of the laser joining system 1, with reference to FIG. 2 and on the basis of the exemplary case of joining the base plate 3 to the storage cell 2 or a plurality of similar storage cells 2.

In a first step 101, the parts to be joined are accommodated in the receptacle 4 of the pressing system 6 of the laser joining system 1. For this purpose, the storage cells 2 are initially placed next to one another in a matrix form within the receptacle 4. The base plate 3 is subsequently placed onto the storage cells 2 and is held in the receptacle 4 by means of a holding device of the receptacle 4.

In a second method step 102, a relative positioning of the pressing element 7 and the receptacle 4 with respect to the first joining point 5 takes place by means of the parallel positioning device 8. This takes place, in particular, by means of the displacement of the linear drives 14, 14', by way of which the scissors mechanism 15 and, therefore, the oblique positioning device 9 and the pressing element 7 are displaced within the work area 17. The state represented in FIG. 1 corresponds to the end state of this method step. It is apparent that the pressing element 7 is positioned above the first joining point 5 in the z-direction.

In a subsequent method step 103, the parts to be joined, i.e., the base plate 3 and the storage cell 2, which are disposed in the area of the first joining point 5, are pressed together locally. For this purpose, the oblique positioning device 9 is actuated and the pressing element 7 is moved in the z-direction toward the base plate 3 until it presses the base plate 3 against the storage cell 2. The pressing element 7 must be moved further or less further in the z-direction depending on the tolerance or the dimension of the storage cell 2. The end position of the pressing element 7 and, therefore, the position of the first joining point 5 under contact pressure are detected by means of the position sensor of the pressing element 7.

On the basis of the position sensor information, the movement is monitored and is readjusted, if necessary.

In the subsequent method step 104, the storage cell 2 is now joined with the base plate 3 at the first joining point by means of the joining laser beam 12. In order to improve the joining result, the focal position of the joining laser beam 12 is matched to the detected position.

The second pressing element 7' is already located in the area of the second joining point 5a.

According to the method, during the remaining time, while joining is carried out at the first joining point 5, the pressing element 7' is lowered in the z-direction at the second joining point 5a, in order to press the base plate 3 locally against the storage cell that is located thereunder, at this point as well. Immediately after completion of the joining at the first joining point 5, the joining laser beam 12 can therefore be deflected to the second joining point 5a in order to join, at this point, the two parts to be joined.

As soon as joining is completed at the second joining point 5a by means of the joining laser beam 12, the first pressing element 7 is raised again counter to the z-direction and is moved to the third joining point 5b by means of the parallel positioning device 8. The duration of the joining carried out at the second joining point 5a is therefore now utilized for moving the first pressing element 7 to the third joining point 5b.

The parts to be joined are therefore joined in succession at the joining points within the beam area 16 by each of the joining points being moved to in succession, by means of the pressing elements 7, 7', and the parts to be joined being pressed together only locally at these joining points.

In this case, a predefined pattern or a predefined sequence of the joining points can be followed. In particular, it is provided in this variant of the method to move to the joining points row-by-row, i.e., transversely with respect to the laser slide rail 11. In one further variant it is provided to move to the joining points column-by-column or along a wavy line.

As soon as all joining points within the beam area 16 have been finally processed, the joining laser 10 is displaced along the laser slide rail 11 and, therefore, the beam area 16 is also displaced, in order to allow for processing at further joining points that have not yet been processed.

In one alternative variant of the method, the processing also includes further processing methods, for example other laser-based processes such as marking or cutting by means of the (joining) laser, also outside of joining points, and, for example, mechanical processing, in particular deformation, by means of pressing elements, in particular in the time phases in which these pressing elements are not located in the area of the present joining point.

In one further variant of the method, the receptacle 4 is formed as a conveyor belt. The conveyor belt and, therefore, the joining elements 2, 3 are displaced continuously in parallel to the plane E in this variant. This displacement is compensated for by means of the scanner of the joining laser 10 in such a way that the joining laser 10 is stationary, in each case, relative to the particular joining point during the joining process. In this variant, the speed of the movement of the receptacle 4 is selected in such a way that at least all joining points in the transverse direction with respect to the joining laser 10 can be processed.

A method for joining parts to be joined, in the area of a joining point, by means of the laser joining system according to the invention therefore results, by means of which parts to be joined can be joined together with minimal delay and, therefore, particularly cost-effectively and efficiently; in particular a current accumulator can be produced from a plurality of storage cells and a base plate.

LIST OF REFERENCE NUMBERS

1 laser joining system
2 storage cell
3 base plate
4 receptacle
5 first joining point
5a second joining point
5b third joining point
6 pressing system
7, 7' pressing element
8, 8' parallel positioning device
9, 9' oblique positioning device
10 joining laser
11 laser slide rail
12 joining laser beam
13,13' slide rail
13a, 13a', 13a", 13a"" linear drive
15, 15' scissors mechanism
beam area
17 work area

What is claimed is:

1. A pressing system for a laser joining system for pressing together parts to be joined in the area of a joining point, the parts to be joined comprising a storage cell and a base plate, the pressing system comprising
   a receptacle for accommodating the parts to be joined,
   at least two mechanical a pressing elements for locally pressing together the parts to be joined, in the area of joining points associated with each of the pressing elements,
   a positioning system for the relative positioning of the pressing elements and the receptacle and for pressing together the parts to be joined, during the joining process, the positioning system comprising
      at least two parallel positioning devices, each one of the parallel positioning devices comprising a drive configured for the relative positioning of the receptacle and the pressing element in parallel to a plane (E), and
      at least two an oblique positioning devices, each one of the oblique positioning devices comprising a drive configured for the relative positioning of the pressing elements and the receptacle obliquely, with respect to the plane (E) and for pressing together the parts to be joined, during the joining process,
wherein a first one of the pressing elements is configured to press together two parts to be joined at a first one of the joining points, while a second one of the pressing elements is displaced to a second one of the joining points, wherein during the joining process at the first joining point, the second pressing element is brought into an area of the second joining point, so that the parts to be joined can be subsequently pressed together and joined at the second joining point.

2. The pressing system according to claim 1, wherein at least one of said parallel positioning devices comprises a scissors mechanism and/or a linear drive.

3. The pressing system according to claim 1, wherein at least one of said pressing elements comprises a sensor comprising at least one of the following: a position sensor for localizing a joining point, a temperature sensor, and a force sensor for measuring the contact pressure.

4. The pressing system according to claim 1, wherein at least one of said pressing elements comprises a temperature-control element for the temperature control of at least one area of the joining point.

5. The pressing system according to claim 1, wherein at least one of said pressing elements has a passage region for the passage of a joining laser beam.

6. A laser joining system for joining parts to be joined in the area of a joining point, comprising:
a joining laser generating a joining laser beam, and
a pressing system according to claim 1.

7. The laser joining system according to claim 6, wherein the joining laser comprises a beam positioning system that is displaceable in parallel to the plane (E), and/or comprises a scanner for controlling the joining laser beam.

8. The laser joining system according to claim 6, wherein the laser joining system (1) comprises a focal position adjusting device for adjusting a focal position of the joining laser beam.

* * * * *

UNITED STATES PATENT AND TRADEMARK OFFICE
CERTIFICATE OF CORRECTION

PATENT NO. : 10,792,761 B2
APPLICATION NO. : 15/820709
DATED : October 6, 2020
INVENTOR(S) : Martin Freundt, Ralf Neher and Benjamin Schmieder It is certified that error appears in the above-identified patent and that said Letters Patent is hereby corrected as shown below:

In the Claims

Column 10, Line 51 (Line 6 of Claim 1), delete "a" after "mechanical";
Column 10, Line 64 (Line 19 of Claim 1), delete "an" after "two".

Signed and Sealed this
Thirtieth Day of April, 2024

Katherine Kelly Vidal
*Director of the United States Patent and Trademark Office*